US012623356B2

(12) United States Patent
Li et al.

(10) Patent No.: US 12,623,356 B2
(45) Date of Patent: May 12, 2026

(54) PARALLEL ROBOT

(71) Applicants: SHANGHAI FLEXIV ROBOTICS TECHNOLOGY CO., LTD., Shanghai (CN); FLEXIV LTD., Cayman Islands (GB)

(72) Inventors: Xuesen Li, Santa Clara, CA (US); Hao Jiang, Santa Clara, CA (US); Shiquan Wang, Shanghai (CN); Shaobo Hu, Shanghai (CN); Maozhi Liu, Santa Barbara, CA (US); Da Xi, Shanghai (CN)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 251 days.

(21) Appl. No.: 18/555,790

(22) PCT Filed: Nov. 28, 2022

(86) PCT No.: PCT/CN2022/134602
§ 371 (c)(1),
(2) Date: Oct. 17, 2023

(87) PCT Pub. No.: WO2024/113074
PCT Pub. Date: Jun. 6, 2024

(65) Prior Publication Data
US 2025/0073918 A1     Mar. 6, 2025

(51) Int. Cl.
B25J 13/08 (2006.01)
B25J 3/00 (2006.01)
B25J 19/00 (2006.01)

(52) U.S. Cl.
CPC .............. B25J 13/085 (2013.01); B25J 3/00 (2013.01); B25J 19/0004 (2013.01)

(58) Field of Classification Search
CPC ........ B25J 13/085; B25J 3/00; B25J 19/0004; B25J 9/00; B25J 9/0051
(Continued)

(56) References Cited

U.S. PATENT DOCUMENTS

| | | |
|---|---|---|
| D433,043 S | 10/2000 | Uematsu et al. |
| D642,765 S | 8/2011 | Long |

(Continued)

FOREIGN PATENT DOCUMENTS

| | | |
|---|---|---|
| CN | 101003133 A | 7/2007 |
| CN | 102279101 A | 12/2011 |

(Continued)

OTHER PUBLICATIONS

United States Notice of Allowance for corresponding U.S. Appl. No. 29/884,901, dated May 28, 2024, 11 pages.
(Continued)

*Primary Examiner* — Kira Nguyen
(74) *Attorney, Agent, or Firm* — Dority & Manning, P.A.

(57) ABSTRACT

A parallel robot includes a base, a moving platform, a plurality of branch chains, a plurality of driving devices, a plurality of transmission devices, a plurality of force/torque sensors, and a control device. The transmission device includes an output end. Each branch chain includes a first end connected to the output end and a second end connected to the moving platform. The driving device is configured to drive the transmission device to move. The force/torque sensor is configured to sense the force and/or torque between the driving device and the output end. The control device is configured to adjust a power of the driving device according to the force and/or torque sensed by the force/torque sensor, a target force or displacement to be loaded on the moving
(Continued)

platform, and a preset rule until the force and/or torque sensed by the force/torque sensor matches the target force or displacement.

5 Claims, 5 Drawing Sheets

(58) Field of Classification Search
   USPC ........................................................ 700/245
   See application file for complete search history.

(56) References Cited

U.S. PATENT DOCUMENTS

| | | | |
|---|---|---|---|
| D759,139 S | 6/2016 | Brogardh et al. | |
| D763,937 S | 8/2016 | Brogardh et al. | |
| D779,146 S | 2/2017 | Tokai et al. | |
| D895,703 S | 9/2020 | Lundback et al. | |
| D992,000 S | 7/2023 | Jin et al. | |
| 11,717,975 B1 | 8/2023 | Receveur et al. | |
| 11,938,624 B2 | 3/2024 | Olsson et al. | |
| 2003/0121350 A1 | 7/2003 | Hvittfeldt et al. | |
| 2006/0182602 A1 | 8/2006 | Schuler et al. | |
| 2007/0137374 A1 | 6/2007 | Schuler et al. | |
| 2010/0005919 A1 | 1/2010 | Breu | |
| 2010/0186534 A1 | 7/2010 | Kinoshita et al. | |
| 2010/0206120 A1* | 8/2010 | Kinoshita | B25J 17/0283 |
| | | | 901/29 |
| 2011/0033275 A1 | 2/2011 | Lehmann | |
| 2011/0120254 A1 | 5/2011 | Zhang et al. | |
| 2011/0259138 A1 | 10/2011 | Hombach et al. | |
| 2011/0277581 A1 | 11/2011 | Bunsendal et al. | |
| 2012/0060637 A1 | 3/2012 | Kinoshita et al. | |
| 2012/0103124 A1 | 5/2012 | Herder et al. | |
| 2012/0118097 A1* | 5/2012 | Ilch | B25J 9/0078 |
| | | | 901/19 |
| 2013/0164107 A1 | 6/2013 | Pehlivan et al. | |
| 2013/0319157 A1 | 12/2013 | Yang | |
| 2014/0084840 A1* | 3/2014 | Osaka | G05B 19/404 |
| | | | 318/632 |
| 2014/0090508 A1 | 4/2014 | Hirano | |
| 2014/0096636 A1 | 4/2014 | Hirano | |
| 2014/0208883 A1 | 7/2014 | Lin et al. | |
| 2014/0338489 A1 | 11/2014 | Peng et al. | |
| 2015/0040713 A1 | 2/2015 | Hirano | |
| 2015/0217454 A1 | 8/2015 | Eliasson | |

| | | | |
|---|---|---|---|
| 2017/0173791 A1* | 6/2017 | Dalibard | B25J 9/1653 |
| 2018/0215054 A1 | 8/2018 | Brudniok | |
| 2018/0229359 A1 | 8/2018 | Westermeier et al. | |
| 2018/0236655 A1 | 8/2018 | Nakanishi | |
| 2018/0257229 A1 | 9/2018 | Wakita | |
| 2019/0101106 A1 | 4/2019 | Cho et al. | |
| 2019/0118378 A1 | 4/2019 | Ludban | |
| 2019/0308313 A1 | 10/2019 | Lundback | |
| 2019/0329429 A1* | 10/2019 | Yamamoto | B25J 19/0062 |
| 2020/0238540 A1 | 7/2020 | Wang et al. | |
| 2020/0247617 A1 | 8/2020 | Watanabe | |
| 2020/0338719 A1 | 10/2020 | Handfest et al. | |
| 2021/0069896 A1 | 3/2021 | Zhao et al. | |
| 2021/0347055 A1* | 11/2021 | Dany | B25J 9/1692 |
| 2021/0362321 A1 | 11/2021 | Olsson et al. | |
| 2022/0097235 A1 | 3/2022 | Noren et al. | |

FOREIGN PATENT DOCUMENTS

| | | | | |
|---|---|---|---|---|
| CN | 104385266 A | | 3/2015 | |
| CN | 204868856 U | | 12/2015 | |
| CN | 108972507 A | | 12/2018 | |
| CN | 113787519 A | | 12/2021 | |
| CN | 215511032 U | | 1/2022 | |
| CN | 114323526 A | | 4/2022 | |
| CN | 115175790 A | | 10/2022 | |
| CN | 115179286 A | | 10/2022 | |
| CN | 115194733 A | * 10/2022 | ............ B25J 9/1661 |
| CN | 115227559 A | | 10/2022 | |
| JP | 2019-162694 A | | 9/2019 | |
| WO | WO2019/039131 A1 | | 2/2019 | |

OTHER PUBLICATIONS

Office Action (w/ English translation) in corresponding CN Application No. 202211505154.7, dated Apr. 27, 2025, in 13 pgs.

PCT International Search Report and Written Opinion for corresponding PCT Application No. PCT/CN2022/134602, dated Aug. 8, 2023, 6 pages.

Notification of Transmittal of the International Search Report and Written Opinion of the International Searching Authority for corresponding PCT Application No. PCT/CN2022/134602, dated Aug. 8, 2023, 1 page.

Office Action (with English translation) received in corresponding Application No. CN 202211505154.7, dated Jan. 1, 2026, 12 pages.

* cited by examiner

PARALLEL ROBOT

CROSS-REFERENCE TO RELATED APPLICATIONS

This application is a U.S. national phase application under 35 U.S.C. § 371 based upon international patent application No. PCT/CN2022/134602, filed on Nov. 28, 2022, the content of which is hereby incorporated by reference in its entirety.

TECHNICAL FIELD

The present disclosure relates to robots, in particular to a parallel robot.

BACKGROUND

Parallel robots, such as Delta robots, have characteristics of fast movement speed, precise positioning, low cost, and high efficiency, which have been widely used in industrial operations such as picking, palletizing, and packaging of food, pharmaceuticals, and electronic products.

Conventional parallel robots are controlled by position control methods, so that the above applications are limited to moving objects between different positions, a application range of parallel robots need to be increased.

SUMMARY

According to some embodiments, a parallel robot that can increase an application range is provided.

A parallel robot includes a base, a moving platform, a plurality of branch chains, a plurality of driving devices, a plurality of transmission devices, a plurality of force/torque sensors, and a control device. The transmission device is connected to the base and comprises an output end, the plurality of branch chains are located between the base and the moving platform in parallel, each branch chain comprises a first end connected to the output end and a second end connected to the moving platform, each driving device is connected to one transmission device and is configured to drive the transmission device to move, so as to enable the transmission device to drive the branch chain to move, each force/torque sensor is connected to one output end and is configured to sense force and/or torque between the driving device and the output end and output the force and/or torque to the control device, the control device is configured to adjust a power of the driving device according to the force and/or torque sensed by the force/torque sensor, a target force or displacement to be loaded on the moving platform, and a preset rule until the force and/or torque sensed by the force/torque sensor matches the target force or displacement.

In one of the embodiments, the transmission device comprises a reducer connected to the output end, and the force/torque sensor is a torque sensor.

In one of the embodiments, the reducer is a harmonic reducer.

In one of the embodiments, a transmission speed ratio of the harmonic reducer is of 50 to 120.

In one of the embodiments, the base comprises a support shaft, the reducer is connected to the support shaft, the transmission device further comprises a cross-roller bearing sleeved on the support shaft, the torque sensor is located between the support shaft and the cross-roller bearing.

In one of the embodiments, the transmission device comprises a guiding element and a transmission element slidably connected to the guiding element, the output end is slidably connected to the guiding element and is connected to the transmission element and the first end, the driving device drives the transmission element to move linearly back and forth along the guiding element, the force/torque sensor is a force sensor.

The parallel robot further includes a brake, when the force or torque sensed by the force/torque sensor exceeds a preset range, the control device activates the brake to brake the driving device.

In one of the embodiments, three branch chains are provided.

In one of the embodiments, the branch chain comprises a master arm and a slave arm, and the output end is connected to one end of the master arm, the other end of the master arm is connected to one end of the slave arm, the other end of the slave arm is connected to the moving platform.

In one of the embodiments, the control device and the driving device are connected by wires, and both the control device and the driving device are fixed to the base.

In the above-mentioned parallel robot, since the force/torque sensor is provided, the force and/or torque on the output end of the transmission device adjacent to the branch chain can be obtained, a power of the driving device can be adjusted according to the preset rule when there is a difference between the force or displacement actually output by the moving platform and the target force or displacement to be loaded on the moving platform, so that the moving platform can output the required force or displacement. In this way, the force or displacement loaded on the moving platform can be controlled in real time, thereby increasing an application range of the parallel robot, such as polishing workpieces or giving massages to people, etc.

Details of one or more embodiments of the present disclosure are set forth in the following drawings and descriptions. Other objects, purposes and advantages will become apparent upon review of the following specification, drawings and claims.

BRIEF DESCRIPTION OF THE DRAWINGS

In order to more clearly explain the embodiments of the present disclosure or the technical solutions in the related art, the accompanying drawings that need to be used in the description of the embodiments or the related art will be briefly introduced below. It is obvious that the drawings in the following description are only the embodiments of the present application. For those skilled in the art, other drawings can be obtained according to the disclosed drawings without paying creative labor.

DETAILED DESCRIPTION OF THE EMBODIMENTS

Figure 1:
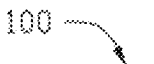
FIG. 1 is a perspective view of a parallel robot according to an embodiment.
Figure 1:
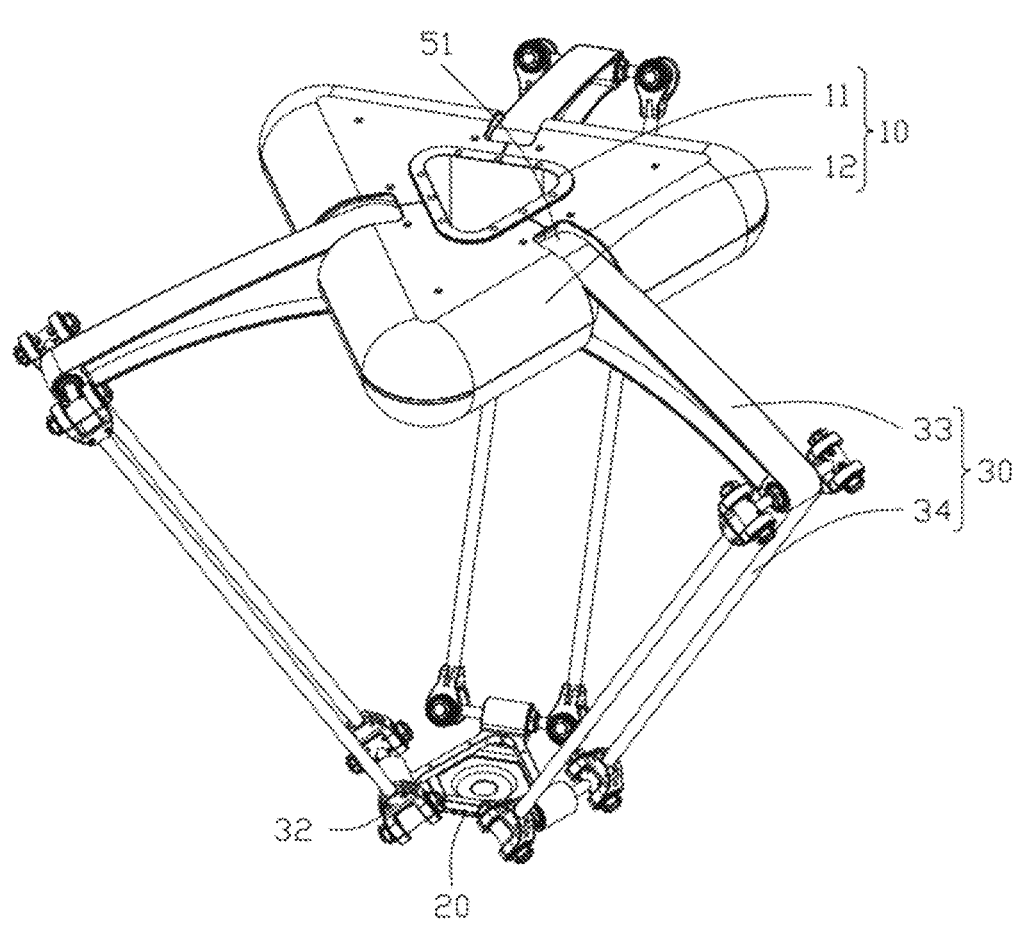

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which is only for the convenience of describing the present disclosure and simplifying the description, rather than indicating or implying that the device or element must have a specific azimuth, be constructed and operated in a specific azimuth, so it cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

In the present invention, unless otherwise expressly specified and limited, the terms "install", "connect", "contact", "fix" and other terms should be understood in a broad sense, for example, they can be fixed connections, removable connections, or integrated. It can be mechanical connection or electrical connection. It can be directly connected or indirectly connected through an intermediate medium. It can be the connection within two elements or the interaction relationship between two elements, unless otherwise expressly limited. For those skilled in the art, the specific meaning of the above terms in the present disclosure can be understood according to the specific situation.

In the present invention, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "disposed on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Figure 2:
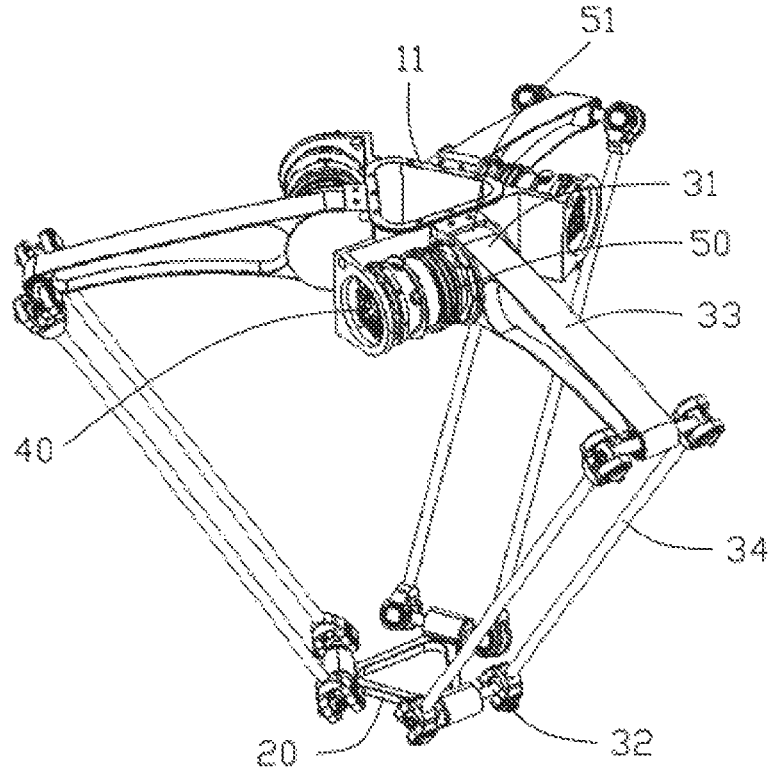
FIG. 2 is a perspective view of the parallel robot in FIG. 1 after removing a protecting cover.
Figure 3:
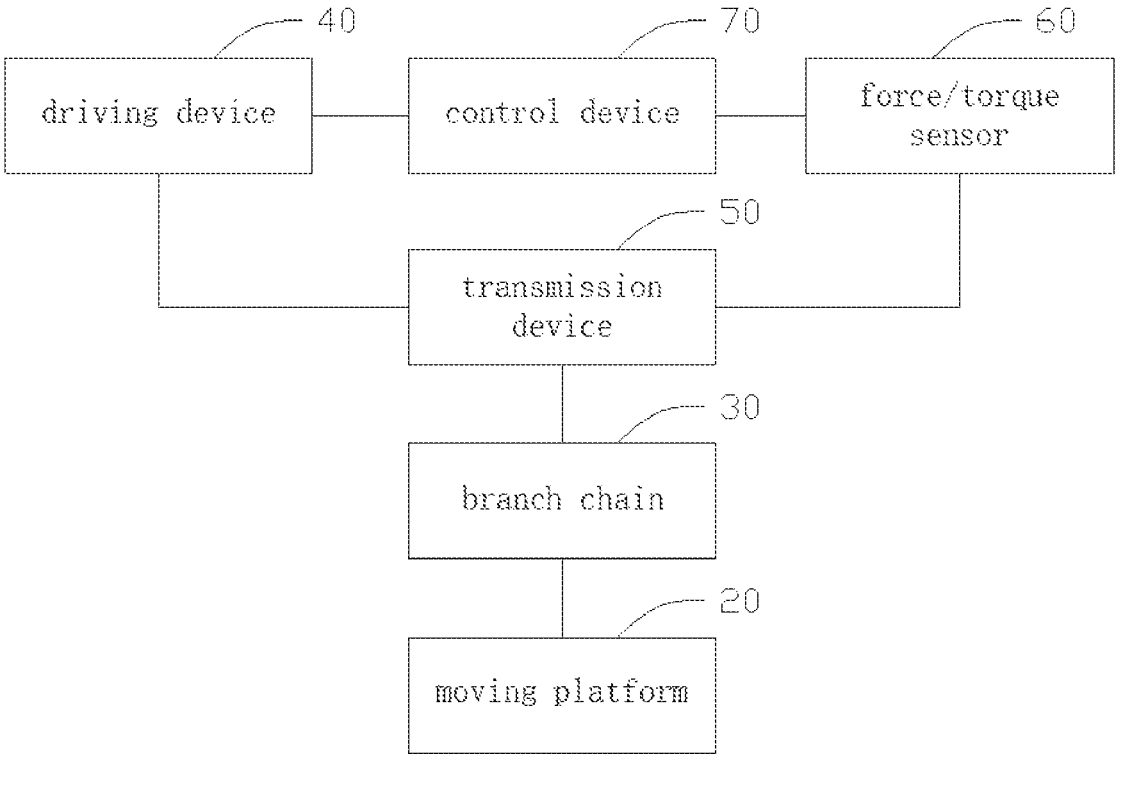
FIG. 3 is a schematic diagram of a movement of the parallel robot according to an embodiment.

Referring to FIGS. 1 to 3, according to an embodiment of the present application, a parallel robot 100 is provided, which includes a base 10, a moving platform 20, a plurality of branch chains 30, a plurality of driving devices 40, and a plurality of transmission devices 50, a plurality of force/torque sensors 60, and a control device 70. The transmission device 50 is connected to the base 10 and includes an output end 51. The plurality of branch chains 30 are placed between the base 10 and the moving platform 20 in parallel. Each branch chain 30 includes a first end 31 connected to the output end 51 and a second end 32 connected to the moving platform 20. Each driving device 40 is connected to a transmission device 50 for driving the transmission device 50 to move, so as to enable the transmission device 50 to drive the branch chain 30 to move, thereby driving the moving platform 20 to move through the branch chain 30 to realize a corresponding action of an execution end on the moving platform 20, such as grabbing action. Each force/torque sensor 60 is connected to the output end 51 of one transmission device 50 and is configured to sense a force and/or a torque between the driving device 40 and the output end 51 and output the force and/or torque to the control device 70. The control device 70 is electrically connected to the driving device 40, and is configured to adjust a power of the driving device 40 according to the force and/or torque sensed by the force/torque sensor 60, a target force or displacement to be loaded on the moving platform 20, and a preset rule until the force and/or torque sensed by the force/torque sensor 60 matches the target force or displacement.

In the above-mentioned parallel robot 100, by providing the force/torque sensor 60, the force and/or torque on the output end 51 of the transmission device 50 adjacent to the branch chain 30 can be obtained, and the force or displacement of the branch chain 30 and the moving platform 20 during movement, that is, an actual output force or displacement of the moving platform 20, can be obtained according to structures of the branch chain 30 and the moving platform 20 and relative positions of the branch chain 30, the moving platform 20 and the output end 51. A preset motion rule of the above-mentioned moving platform 20 can be pre-stored in the control device 70, the control device 70 can adjust the power of the driving device 40 according to the preset rule when there is a difference between the force or displacement actually output by the moving platform 20 and the target force or displacement to be loaded on the moving platform 20, so that the moving platform 20 can output the required force or displacement. In this way, the force or displacement loaded on the moving platform 20 can be controlled in real time, thereby increasing an application range of the parallel robot 100, such as polishing workpieces or giving massages to people, etc. A control method of the parallel robot 100 can be achieved by position control (such as impedance control), force control (such as admittance control) or force-position hybrid control, which is selected according to a specific application scenario and is not limited here.

In addition, by providing the force/torque sensor 60 at the output end 51 of the transmission device 50, the force or displacement output by the moving platform 20 can be accurately acquired according to the force and/or torque on the output end 51 of the transmission device 50 adjacent to the branch chain 30 sensed by the force/torque sensor 60. Compared with the way of providing the force/torque sensor 60 at an output end of the driving device 40 to calculate the force or displacement output by the moving platform 20 according to the output end of the driving device 40, and calculating the force or displacement output by the moving platform 20 according to a driving power of the driving device 40, that is, a current of the driving device 40, it avoids influence factors of a transmission loss from the output end of the driving device 40 to the output end 51 of the transmission device 50, and improves an accuracy of the obtained force or displacement output by the moving platform 20, so as to more precisely control the force or displacement output by the actuation platform 20.

Referring to FIG. 1 and FIG. 2, in an embodiment, the base 10 includes a triangular fixing base 11 and three protecting covers 12 respectively covering three edges of the fixing base 11. The number of the driving device 40, the transmission device 50, and the branch chain 30 are all three. It should be understood that, in other embodiments, the base 10 may be in a regular shape such as a circle, a quadrangle, or an irregular shape. The number of the driving device 40, the transmission device 50, and the branch chain 30 may also be more than three, for example, four, five, etc.

Each branch chain 30 includes a master arm 33 and a slave arm 34. One end of the master arm 33 transversely passes through the protecting cover 12 and is rotatably connected to the fixing base 11, and the output end 51 of the transmission device 50 is connected to one end of the master arm 33, and the other end of the master arm 33 is connected to an end of the slave arm 34, the other end of the slave arm 34 is connected to the moving platform 20. As shown in FIGS. 1 and 2, in the embodiment, the branch chain 30 is configured as a branch chain configuration of a Delta type parallel robot. It should be understood that the principles and spirit of the present application can also be applied to other various types of parallel robot configurations.

Each driving device 40 and a transmission device 50 are fixed in one protecting cover 12. Referring to FIG. 3, in an embodiment, the control device 70 is connected to the driving device 40 through wires, and both the control device 70 and the driving device 40 are fixed in the protecting cover 12. In another embodiment, the control device 70 is wirelessly connected to the driving device 40 and is spatially independent from the base 10. Each control device 70 controls the corresponding driving device 40 to output power, each driving device 40 drives the corresponding transmission device 50 to move, so that the output end 51 of the transmission device 50 drives the corresponding master arm 33 and driven arm 34 to rotate, so that the moving platform 20 can move, so as to realize the corresponding action of the execution end on the moving platform 20.

Figure 4:
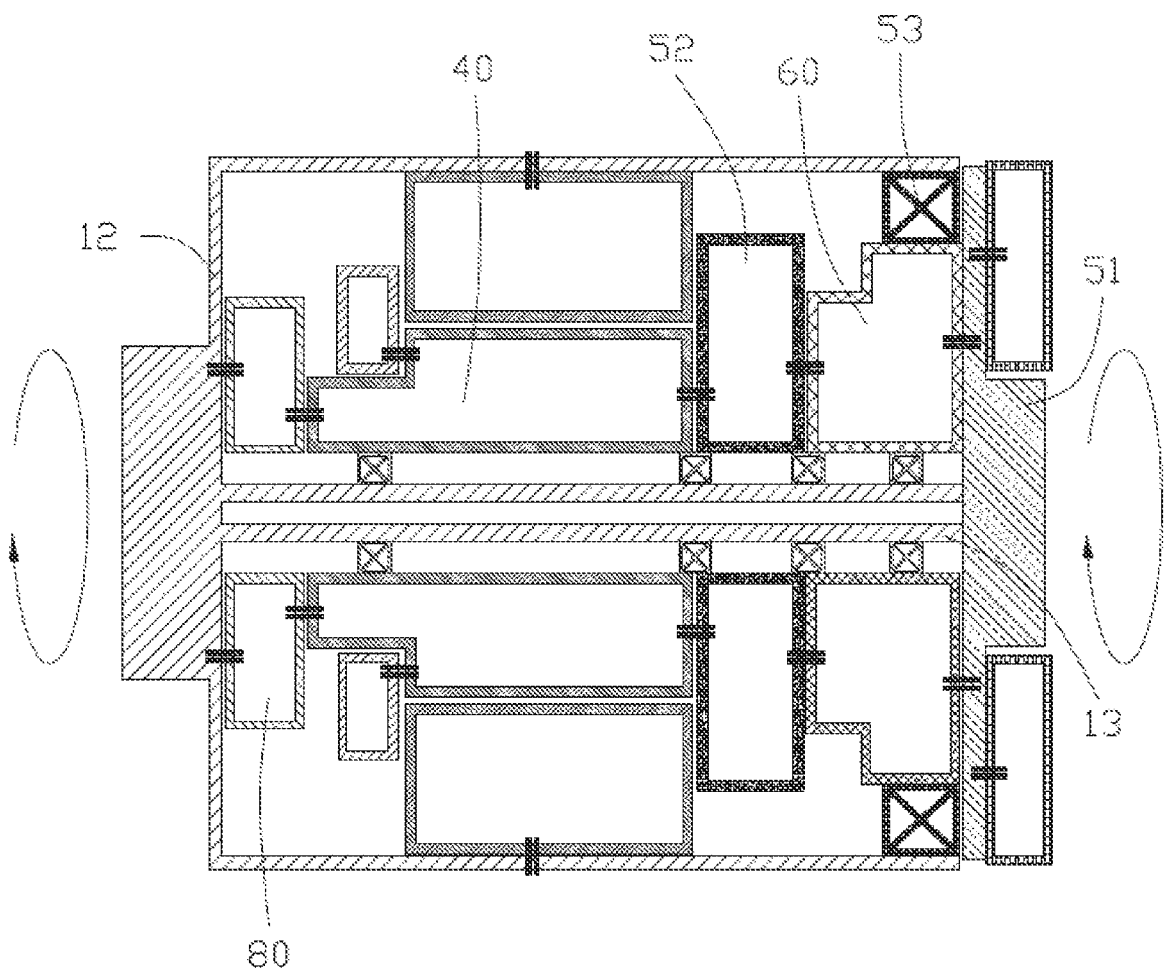
FIG. 4 is a schematic diagram of a driving device and a transmission device in FIG. 2.

Referring to FIG. 2 and FIG. 4, in an embodiment, the driving device 40 and the transmission device 50 are located on a side of the master arm 33. The driving device 40 is a servo motor, the transmission device 50 includes a reducer 52. A support shaft 13 is provided inside the protecting cover 12, the servo motor and the reducer 52 are connected to the support shaft 13, and the reducer 52 is connected to the output end 51. The above-mentioned force/torque sensor 60 is a torque sensor, and the torque sensor is connected between the reducer 52 and the output end 51. In this way, the servo motor drives the reducer 52 to move, so as to drive the output end 51 and the first end 31 on the master arm 33 to rotate through the reducer 52, and the torque sensor is configured to sense the torque of the output end 51 during rotation. Further, the above-mentioned reducer 52 is a harmonic reducer. Since the harmonic reducer has characteristics of large transmission speed ratio, high load capacity and high transmission precision, the parallel robot 100 can have higher speed, higher rigidity and higher payload, so that the force or displacement range that can be loaded on the moving platform 20 is greater, thereby further increasing the application range of the parallel robot 100. In an embodiment, a transmission speed ratio of the harmonic reducer is of 50 to 120. In an embodiment, the transmission device 50 further includes a cross-roller bearing 53 sleeved on the support shaft 13, the torque sensor is located between the support shaft 13 and the cross-roller bearing 53. In this embodiment, on the one hand, the harmonic reducer with no backlash characteristics is configured as the reducer 52, on the other hand, the torque sensor is located between the reducer 52 and the output end 51, so that the torque output by the parallel robot 100 to each branch chain 30 can be accurately measured and controlled, and thus precise force control of the whole parallel robot 100 can be achieved.

In an embodiment, the parallel robot 100 further includes a brake 80. The brake 80 is connected to the protecting cover 12 and located adjacent to the driving device 40. When the torque sensed by the torque sensor exceeds a preset range, the control device 70 activates the brake 80 to brake the driving device 40. In this way, when the execution end on the moving platform 20 is accidentally impacted, the driving device 40 can be braked by the brake 80 to decelerate or stop the movement of the execution end, so as to prevent the execution end from being damaged. For example, when the moving platform 20 encounters an obstacle, the driving device 40 can be braked by the brake 80 to stop the moving platform 20, thereby expanding an interaction ability between the parallel robot 100 and an environment. Specifically, the driving device 40 is a servo motor. When the torque sensed by the torque sensor exceeds the preset range, the brake 80 is activated to brake a rotor of the servo motor, so as to decelerate or stop the servo motor, thereby decelerating or stopping the moving platform 20.

Figure 5:
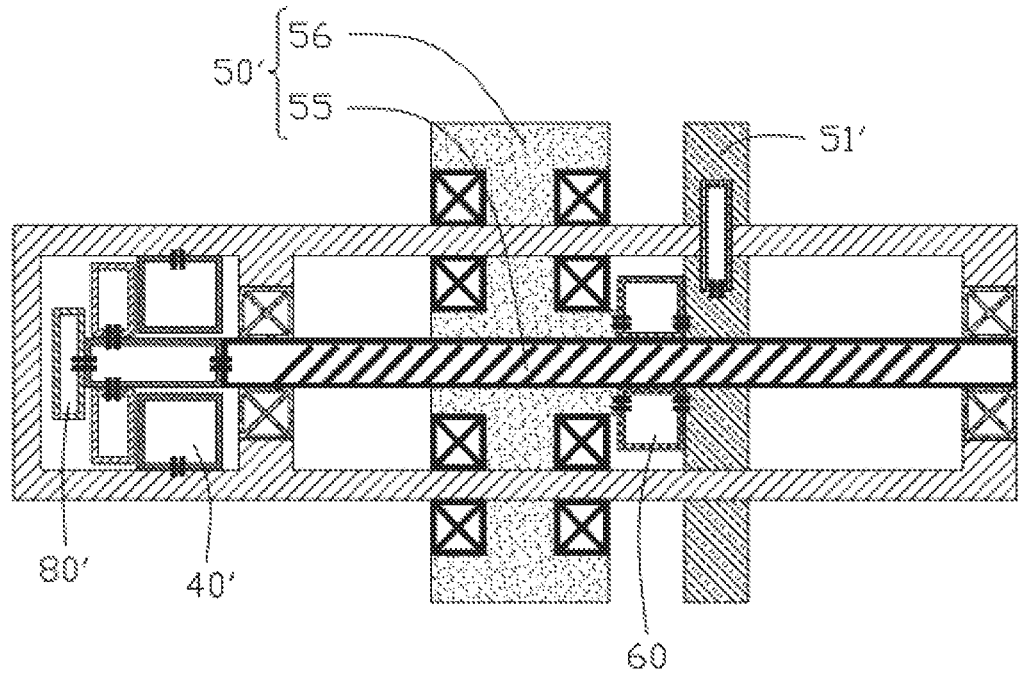
FIG. 5 is a schematic diagram of a driving device and a transmission device according to another embodiment.

In the embodiment shown in FIG. 2 and FIG. 4, the transmission device 50 drives the first end 31 of the branch chain 30 to rotate. Referring to FIG. 5, in another embodiment, the transmission device 50' drives a first end of the branch chain to move linearly, and the above-mentioned force/torque sensor 60 is a force sensor. Specifically, the transmission device 50' includes a guiding element 55 and a transmission element 56 slidably connected to the guiding element 55. The output end 51' of the transmission device 50' is slidably connected to the guiding element 55 and is connected to the transmission element 56 and the first end of the branch chain. The driving device 40' drives the transmission element 56 to move linearly back and forth along the guiding element 55. When the transmission element 56 moves, the output end 51' is driven to move back and forth linearly along the guiding element 55, so that the first end of the branch chain is driven to move back and forth linearly along the guiding element 55 through the output end 51'. The force sensor is connected between the transmission element 56 and the output end 51', and is configured to sense a force received by the output end 51' when it moves along the guiding element 55. In this embodiment, a second end of the branch chain is rotatably connected to a moving platform, and a hinge structure is further provided between the first end and the second end of the branch chain. When the driving device 40' drives the transmission element 56 to move along the guiding element 55, the first end of the branch chain moves along with the transmission element 56 along the guiding element 55 and at the same time rotates relative to the transmission element 56 through the hinge structure, so that the second end of the branch chain also has linear motion and rotational motion to drive the moving platform to move. Similar to the embodiment shown in FIG. 4, in the embodiment shown in FIG. 5, the parallel robot 100 also includes a brake 80'. When the force sensed by the force sensor exceeds the preset range, the control device 70' activates the brake 80' to brake the driving device 40'.

While some features and aspects of exemplary embodiments have been described, those skilled in the art should understood that many modifications are possible. For example, the methods and processes described herein may be implemented using hardware components, software components, and/or any combination thereof. In addition, although various methods and processes have been described with respect to specific structural and/or functional components, the methods provided by the above various embodiments are not limited to any specific structural and/or functional architecture, but can be implemented in any suitable implemented in hardware, firmware and/or software configurations. Similarly, although some functionality is attributed to some system components, unless the context dictates otherwise, the functionality may be distributed among various other system components according to several embodiments.

Additionally, although the methods and processes of the present application are described in a particular order for ease of description, various processes may be re-ordered, added, and/or omitted according to various embodiments unless the context dictates otherwise. Also, processes described with respect to one method or process may be incorporated into other described methods or processes, however, present application is not limited thereto. Similarly, components described with respect to a particular structural architecture and/or with respect to one system may be organized in alternative structures and/or incorporated into other described systems. Thus, although various embodiments have been described with or without some features, various components and/or features described herein with respect to particular embodiments may be replaced, added and/or removed, unless the context dictates otherwise. Therefore, while several exemplary embodiments are described above, it should be understood that any modifications and equivalent replacements made within the spirit and principles of the above-mentioned embodiments shall be included within the protection scope of the present application.

What is claimed is:

1. A parallel robot, comprising:
a base, a moving platform, a plurality of branch chains, a plurality of driving devices, a plurality of transmission devices, a plurality of force/torque sensors, and a control device;
wherein the transmission device is connected to the base and comprises an output end;

the plurality of branch chains are located between the base and the moving platform in parallel, each branch chain comprises a first end connected to the output end and a second end connected to the moving platform;
each driving device is connected to one transmission device and is configured to drive the transmission device to move, so as to enable the transmission device to drive the branch chain to move;
each force/torque sensor is connected to one output end and is configured to sense force and/or torque between the driving device and the output end and output the force and/or torque to the control device;
the control device is configured to adjust a power of the driving device according to the force and/or torque sensed by the force/torque sensor, a target force or displacement to be loaded on the moving platform, and a preset rule until the force and/or torque sensed by the force/torque sensor matches the target force or displacement;
wherein the transmission device comprises a guiding element and a transmission element slidably connected to the guiding element, the output end is slidably connected to the guiding element and is connected to the transmission element and the first end, the driving device drives the transmission element to move linearly back and forth along the guiding element, the force/torque sensor is a force sensor.

2. The parallel robot according to claim 1, further comprising a brake, wherein when the force sensed by the force sensor exceeds a preset range, the control device activates the brake to brake the driving device.

3. The parallel robot according to claim 1, wherein three branch chains are provided.

4. The parallel robot according to claim 1, wherein the branch chain comprises a master arm and a slave arm, and the output end is connected to one end of the master arm, the other end of the master arm is connected to one end of the slave arm, the other end of the slave arm is connected to the moving platform.

5. The parallel robot according to claim 1, wherein the control device and the driving device are connected by wires, and both the control device and the driving device are fixed to the base.

* * * * *